United States Patent
Goto et al.

(10) Patent No.: US 6,535,212 B1
(45) Date of Patent: *Mar. 18, 2003

(54) METHOD OF CONSTRUCTING THREE-DIMENSIONAL IMAGE SUCH AS THREE-DIMENSIONAL IMAGE OBTAINED WHEN INTERNAL PARTS ARE OBSERVED THROUGH A HOLE

(75) Inventors: Yoshihiro Goto, Tokyo (JP); Kazuhiro Sato, Ibaraki-ken (JP)

(73) Assignee: Hitachi Medical Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/460,937
(22) Filed: Jun. 5, 1995

(30) Foreign Application Priority Data

Jul. 26, 1994 (JP) .................................................. 6-173972

(51) Int. Cl.⁷ .............................................. G06T 17/00
(52) U.S. Cl. ...................................................... 345/427
(58) Field of Search .............................. 395/124, 127, 395/134, 118; 345/424, 427, 434

(56) References Cited

U.S. PATENT DOCUMENTS

| | | | |
|---|---|---|---|
| 5,101,475 A | * | 3/1992 | Kaufman et al. ......... 395/127 X |
| 5,179,370 A | * | 1/1993 | Sato ............................ 345/201 |
| 5,249,264 A | * | 9/1993 | Matsumoto ................. 395/134 |

FOREIGN PATENT DOCUMENTS

JP 64-37678 * 2/1989

OTHER PUBLICATIONS

Foley et al., "Computer Graphics, Principles and Practice", Second Edition, Adison–Wesley Publishing Co., pp 237–242, 1993.*

Suto et al., "An Algorithm for Removing Sections of Bone from X–Ray CT Models", Systems and Computers in Japan, vol. 22, No. 3, 1991.*

* cited by examiner

Primary Examiner—Ulka J. Chauhan
Assistant Examiner—Lance W. Sealey
(74) Attorney, Agent, or Firm—Antonelli, Terry, Stout & Kraus, LLP

(57) ABSTRACT

A method of constructing a three-dimensional image by using a central projection method, in which a predetermined region containing a point of view is set in advance, and in the case of performing coordinate transformation by the central projection method and shading, the coordinate transformation and shading are applied not to coordinates of pixels within said region but to coordinates of pixels out of said region.

15 Claims, 9 Drawing Sheets

METHOD OF CONSTRUCTING THREE-DIMENSIONAL IMAGE SUCH AS THREE-DIMENSIONAL IMAGE OBTAINED WHEN INTERNAL PARTS ARE OBSERVED THROUGH A HOLE

CROSS-REFERENCE TO RELATED APPLICATION

The present application relates to the subject matter described in application Ser. No. 08/374,088 filed on Jan. 18, 1995, now U.S. Pat. No. 5,694,530, by Yoshihiro GOTO, entitled "METHOD OF CONSTRUCTING THREE-DIMENSIONAL IMAGE ACCORDING TO CENTRAL PROJECTION METHOD AND APPARATUS FOR SAME", and then assigned to the same assignee as the present application.

The disclosure of application Ser. No. 08/374,088 is incorporated herein by reference.

BACKGROUND OF THE INVENTION

The present invention relates to a three-dimensional image constructing method in which a plurality of tomographic images, for example, obtained by an X-ray computerized tomography (CT) apparatus or obtained by decomposing a volume image measured three-dimensionally by an MRI apparatus are stacked up to thereby obtain a stacked three-dimensional image (three-dimensional original image) and then two-dimensional images obtained by observing the stacked three-dimensional image from arbitrary directions are shaded to construct a three-dimensional image (which means an image constituted by two-dimensionally arranged pixels but made to look like a three-dimensional image by shading).

The three-dimensional image constructing method of this type is known heretofore. As a conventional method, a parallel projection method is used for transformation of coordinates of pixels into a coordinate system of a projection plane equivalent to a display screen.

The parallel projection method used conventionally for transformation of coordinates of pixels is effective for constructing a three-dimensional image obtained by observing a subject such as for example an internal organ, or the like, from the outside of the subject. The method is however unsuitable for constructing a three-dimensional image obtained by observing the subject from the inside (that is, by placing a view point in the inside of the subject). Accordingly, the conventional parallel projection method cannot satisfy the demand that three-dimensional images should be obtained as if the inside of the subject was observed through an endoscope.

Therefore, a three-dimensional image constructing method disclosed in Japanese application No. 6-3492, which is one of the Japanese priority applications of U.S. application Ser. No. 08/374,088 which has been incorporated herein by reference, has been developed. This is a method in which transformation of coordinates of pixels on each tomographic image into coordinates on a projection plane is performed by using a central projection method to thereby project each tomographic image onto the projection plane; and pixel values are given to the coordinates of pixels on the projection plane in accordance with a shading algorithm to perform shading to thereby construct a three-dimensional image. Referring to FIG. 1, this three-dimensional image constructing method will be described below.

FIG. 1 is a view for explaining the coordinate transformation based on central projection method and shows that projection of a point $S(x0, z0, y0)$ on a tomographic image 30 onto a projection plane 20 results in a point $P(x, y, z)$ on the projection plane 20. Assume now that a plurality of tomographic images 30 (#1, #2, . . . , #n) exist in practice.

In FIG. 1, at the time of projection of a tomographic image 30 onto the projection plane 20 according to the central projection method, the coordinates of pixels of the tomographic image 30 are transformed into coordinates on the projection plane 20 as follows.

Here, a represents a point of intersection of the x axis and the projection plane 20, b represents a point of intersection of the y axis and the projection plane 20, and c represents a point of intersection of the z axis and the projection plane 20.

Further, α represents an angle between the x axis and a line obtained through projection, onto the z-x plane, of a perpendicular from the origin to the projection plane 20; β represents an angle between the above-mentioned perpendicular and the x-z plane; a point $e(x1, y1, z1)$ represents the position of a view point e: a point $P(x, y, z)$ represents a point on the projection plane (equivalent to the display screen) 20; and a point $S(x0, z0, y0)$ represents a point of intersection of the tomographic image 30 and a line 22 passing through the point $e(x1, y1, z1)$ and the point $P(x, y, z)$.

Under the aforementioned definition, the following equations hold.

First, the projection plane 20 is given by the equation:

$$(x/a)+(y/b)+(z/c)=1 \quad (1)$$

Further, the line 22 passing through the point $e(x1, y1, z1)$ and the point $P(x, y, z)$ is given by the equation:

$$(x0-x)/(x1-x) = (y0-y)/(y1-y) \quad (2)$$
$$= (z0-z)/(z1-z)$$

When the projection plane 20 is drawn through a point $C1(xc1, yc1, zc1)$, the values z, x and y are given by the following equations:

$$z=[X \cdot k1 - Y \cdot k2 - yc1 \cdot k3 - \{(ci \cdot k3 \cdot zc1)/bi\} + \{(ai \cdot k3 \cdot X)/(bi \cdot \cos \alpha)\} - \{(ai \cdot k3 \cdot xc1)/bi\}]/[1 - \{(ci \cdot k3)/bi\} + \{(ai \cdot k3 \cdot \sin \alpha)/(bi \cdot \cos \alpha)\}] \quad (3)$$

$$x=(X-z \cdot \sin \alpha)/\cos \alpha \quad (4)$$

$$y=[yc1+\{-ci \cdot (z-zc1) - ai \cdot (x-xc1)\}]/bi \quad (5)$$

in which $k1=\sin \alpha$, $k2=\cos \alpha/\sin \beta$, $k3=\cos \alpha \cdot \cos \beta/\sin \beta$, $ai=1/a$, $bi=1/b$, and $ci=1/c$.

Here, as the aforementioned point $C1(xc1, yc1, zc1)$, for example, a point of intersection of a perpendicular drawn from the view point $e(x1, y1, z1)$ to the projection plate 20 and the projection plane 20 may be used under the conditions as follows:

$$zc1=z1 \pm [h/\text{sqrt}\{1+(c^2/a^2)+(c^2/b^2)\}] \text{ ("−" in "z1±" is valid in the case of } z0<zc1) \quad (6)$$

$$xc1=x1+\{c \cdot (z1-zc1)/a\} \quad (7)$$

$$yc1=y1+\{c \cdot (z1-zc1)/b\} \quad (8)$$

in which h represents the length of the perpendicular from the view point $e(x1, y1, z1)$ to the projection plane 20.

When the projected image is expressed with 512 pixels by 512 pixels on the display screen (not shown) equivalent to the projection plane 20, each of X and Y takes values of −256 to +256. Values of x and y are determined correspondingly to the respective values of X and Y in accordance with the aforementioned equations (3), (4) and (5). Because x1, y1 and z1 of the point e are given freely, coordinates x0 and z0 of the pixel point S on the tomographic image y0=d0 are determined in accordance with the following equations (9) and (10).

$$x0=\{(d0-y)/(y1-y)\}\times(x1-x)+x \quad (9)$$

$$z0=\{(d0-y)/(y1-y)\}\times(z1-z)+z \quad (10)$$

Because d0 takes a plurality of values correspondingly to the plurality of tomographic images, a plurality of points (x0, z0) to be projected are determined correspondingly to one combination of X and Y on the projection plane.

In FIG. 1, L represents the distance from the view point e to the point S, and L is a parameter for obtaining the pixel value (luminance) of the point P. The pixel value of the point P is proportional to a value obtained by subtracting the above L from the maximum pixel value L max which is set in advance. As the value of L max−L increases, the density on the screen is made bright.

The aforementioned coordinate transformation is performed with respect to all the points on the projection plane 20 equivalent to the display screen. Further, the aforementioned coordinate transformation is performed with respect to all the tomographic images 30.

Further, shading is performed so that a scenographic feeling is given to construct a three-dimensional image when the tomographic images are displayed on a two-dimensional display screen. A predetermined shading algorithm, for example, a depth method, is used for shading, so that pixel values are given to coordinates of respective pixels on the projection plane 20 in accordance with the shading algorithm.

According to the method of FIG. 1, a three-dimensional image can be obtained as if the inside of a subject is observed through an endoscope, because projection lines spread out radially from the view point.

The aforementioned method is however premised on the assumption that the view point e is placed in a space originally open in the inside of a subject such as an esophagus, a trachea, an intestine, or the like. Accordingly, it is impossible to construct such a three-dimensional image as seen when the inside (having an area) of a subject is peeped into through a small hole. Particularly, as shown in FIG. 2, it is impossible to construct a three-dimensional image as seen when a subject 26 is observed through a peritoneoscope 25 inserted into the subject 26. The method cannot meet the demand to obtain such images.

SUMMARY OF THE INVENTION

An object of the present invention is to provide a three-dimensional image constructing method which makes it possible to obtain a three-dimensional image as if the inside (having an area) of a subject was peeped into through a small hole, particularly, a the three-dimensional image as if the inside of a subject was observed through a peritoneoscope inserted into the subject.

The foregoing object of the present invention is achieved by a three-dimensional image constructing method in which a plurality of tomographic images including volume images are stacked to thereby obtain a stacked three-dimensional image, and a two-dimensional image obtained by observing the stacked three-dimensional image from an arbitrary direction is shaded to thereby construct a three-dimensional image, in which at the time of projection of each of the tomographic images onto a projection plane, coordinates of pixels in the tomographic image are transformed into coordinates on the projection plane by using central projection method and then shading is performed by giving pixel values to the coordinates of pixels on the projection plane in accordance with a shading algorithm to thereby construct a three-dimensional image, and in which a predetermined region containing a point of view is set in advance so that coordinate transformation according to the central projection method and shading are applied not to coordinates of pixels within the region but only to coordinates of pixels out of the region.

That is, the present invention can be expressed as follows.

A method of constructing a three-dimensional image by using a central projection method, including the steps of:

(a) setting coordinates of a point of view on a memory space so that a projection subject image is located between the view point and a plane of projection;

(b) setting a predetermined region containing said view point;

(c) judging whether coordinates of a pixel to be projected are in said predetermined region or not; and (d) applying coordinate transformation according to the central projection method and shading to the coordinates of the pixel to be projected only when the coordinates of the pixel are out of said predetermined region, while the coordinate transformation according to the central projection method and shading are not applied to the coordinates of the pixel to be projected when the coordinates of the pixel are in said predetermined region.

Because the set region containing the view point serves as a small hole and because a central projection method is used for transformation of coordinates of pixels in the tomographic image, a larger image than the size of the hole can be seen.

Accordingly, it is made possible to obtain a three-dimensional image as if the inside (having an area) of a subject was peeped into through a small hole and, particularly, a three-dimensional image as if the inside of a subject 26 was observed through a peritoneoscope 25 inserted into the subject 26 as shown in FIG. 2.

DESCRIPTION OF THE PREFERRED EMBODIMENTS

Figure 3:
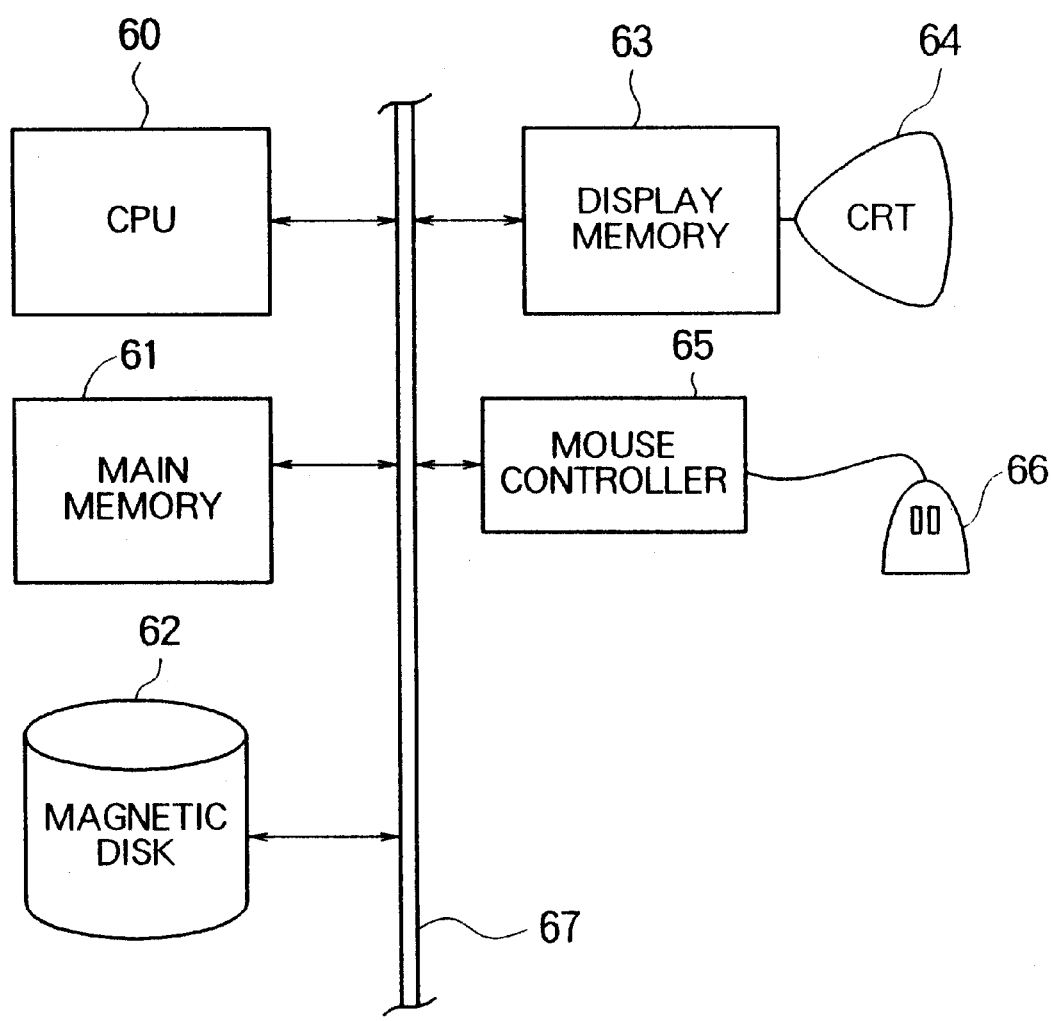
FIG. 3 is a block diagram showing an example of a hardware configuration to which the present invention can be applied.

FIG. 3 is a block diagram showing an example of a hardware configuration to which the present invention can be applied.

In FIG. 3, the reference numeral 60 designates a central processing unit (CPU); 61, a main memory; 62, a magnetic disk; 63, a display memory; and 65, a mouse controller. These are connected to a common bus 67. A plurality of tomographic images and programs such as a program for coordinate transformation, a program for shading, and so on, are stored in the magnetic disk 62.

The CPU 60 reads the plurality of tomographic images and the programs for coordinate transformation and shading from the magnetic disk 62, constructs a three-dimensional image, by using the main memory 61, as if the inside of the subject was observed through a peritoneoscope, and feeds the resulting three-dimensional image to the display memory 63 to display the three-dimensional image on a CRT monitor 64. A mouse 66 connected to the mouse controller 65 is used to set the position of the view point, or the like, for constructing the three-dimensional image. The three-dimensional image thus obtained is stored in the magnetic disk 62 as occasion demands.

The theory of the present invention will be described below with reference to FIGS. 4 and 5.

In the method of the present invention, at the time of projection of each of tomographic images 30 onto a projection plane 20, coordinates of pixels in each of the tomographic images 30 are transformed into coordinates on the projection plane 20 by use of a central projection method and then shading is performed by giving pixel values to the coordinates of the respective pixels on the projection plane 20 in accordance with a predetermined shading algorithm.

Figure 4:
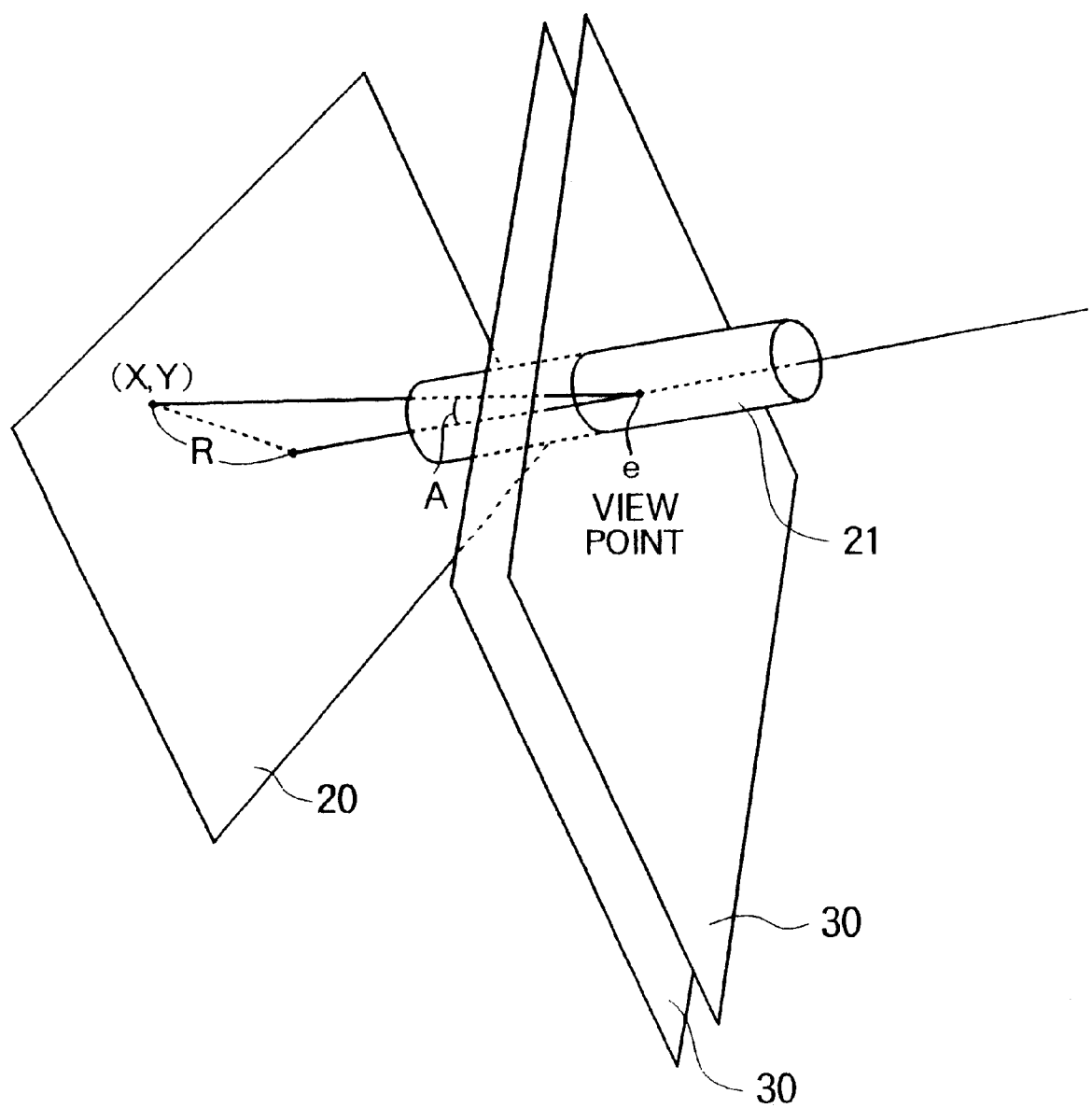
FIG. 4 is a view for explaining the theory of the three-dimensional image constructing method according to the present invention.
Figure 5:
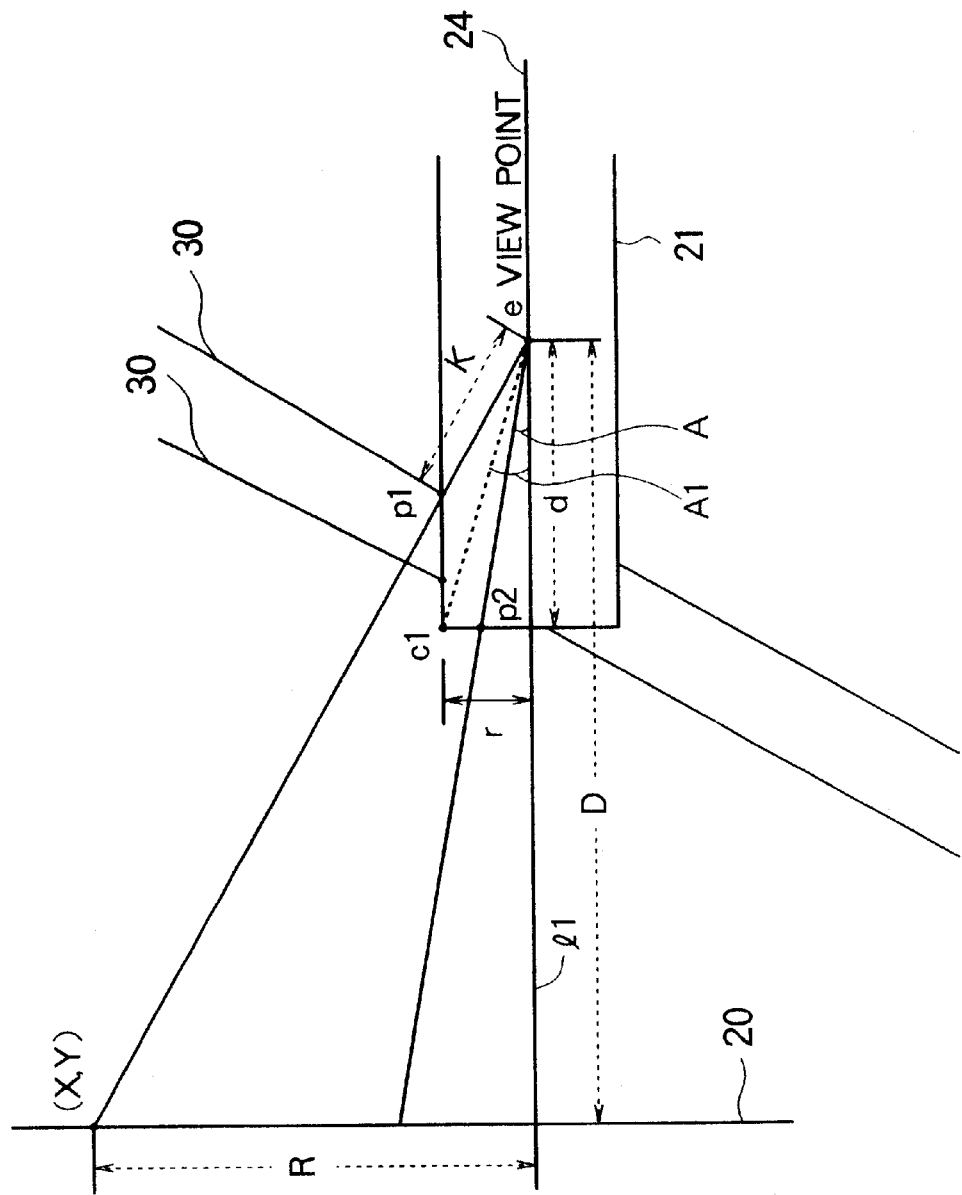
FIG. 5 is a detailed view of FIG. 4.

In this occasion, as shown in FIGS. 4 and 5, a predetermined region 21 is set around the view point e in advance so as to strike through the tomographic images 30. Pixels of the tomographic images 30 contained in this region 21 are neglected so that coordinate transformation and shading are not applied to the pixels. On the other hand, pixels of the tomographic images 30 not contained in this region 21 are subjected to the coordinate transformation and shading.

The fact that pixels of the tomographic images 30 contained in the region 21 are neglected in this manner is equivalent to the fact that a hole is punctured in the subject, for example, at the time of use of a peritoneoscope, or the like.

This will be explained with reference to FIG. 5. Assume now that the region 21 is shaped like a cylinder with the radius of r, and that the distance from the view point e to a forward end face of the cylinder (region 21) is d.

In FIG. 5, coordinate transformation and shading are carried out only in either of the following cases (a) and (b) on the basis of the distance K between the view point e and an intersection p(p1, p2, . . . ) of the region 21 and a line passing through a point (X, Y) on the projection plane 20 and the view point e. Incidentally, A1 represents an angle between a line 24 passing through the view point e and the projection plane 20 and a line passing through the view point e and an edge c1 of the cylinder (region 21). Further, D represents the distance of a perpendicular drawn from the view point e to the projection plane 20, and R represents the distance from an intersection of the line 24 and the projection plane 20 to the point (X, Y).

(a) In the case where the intersection p is on the side surface of the cylinder (region 21), that is, in the case of A>A1, coordinate transformation and shading are carried out as long as the condition K>r/sin A is satisfied.

(b) In the case where the intersection p is on the forward end face of the cylinder (region 21), that is, in the case of A≦A1, coordinate transformation and shading are carried out as long as the condition K>d/cos A is satisfied.

Here, $\tan A = R/D$
$= \mathrm{sqrt}(X^2 + Y^2)/D$, and $\tan A1 = r/d$.

In this manner, when the region 21 is shaped like a cylinder, coordinate transformation and shading are carried out only in each of the cases (a) and (b) because pixels of the tomographic images 30 are out of the region 21 in each of the cases (a) and (b).

Coordinate transformation is carried out by the aforementioned central projection method. A predetermined shading algorithm such as for example a depth method is used for shading, so that pixel values are given to the coordinates of the respective pixels on the projection plane 20 in accordance with the shading algorithm.

Figure 6:
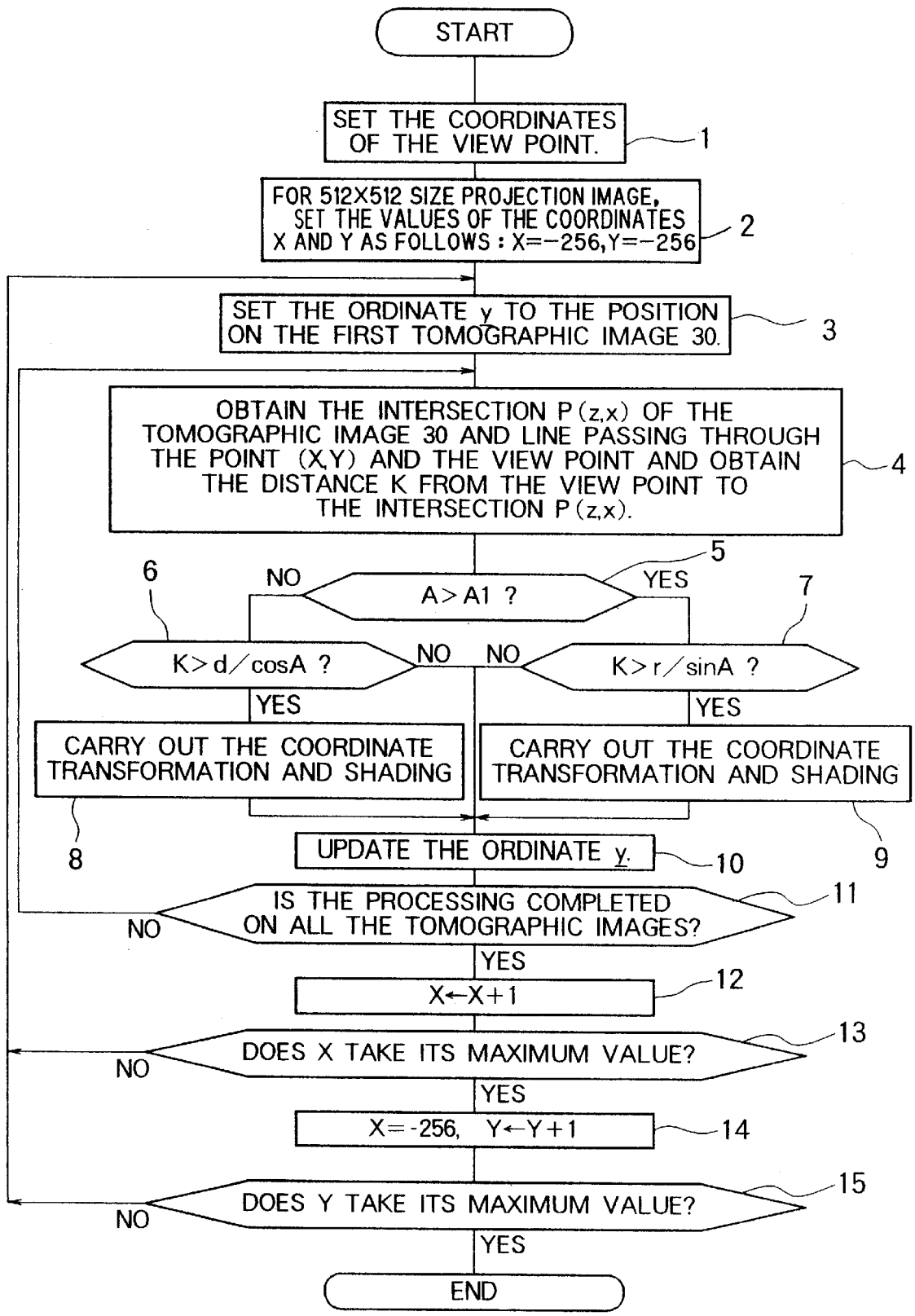
FIG. 6 is a flow chart showing an embodiment of the three-dimensional image constructing method according to the present invention.

FIG. 6 is a flow chart showing an embodiment of the three-dimensional image constructing method according to the present invention. An embodiment of the method of the present invention will be described below on the basis of the steps shown in FIG. 6 in conjunction with FIGS. 4 and 5.

Assume now that a plurality of tomographic images are read into the main memory 61 by the CPU 60 and a projection plane is set on a memory space in advance.

Assume further that, as shown in FIG. 4, a predetermined region 21 is set around the view point e so as to strike through the tomographic images 30 and that, as shown in FIGS. 4 and 5, the region 21 is shaped like a cylinder with the radius of r, and the distance from the view point e to the forward end face of the cylinder (region 21) is d.

Step 1—The coordinates of the view point is set in the region 21 so that the tomographic images are located between the projection plane and the view point.

Step 2—The coordinates (X, Y) on the projection plane 20 are set to X=−256 and Y=−256, when a projection image of 512×512 size is constructed.

Step 3—The ordinate y is set on the position of a tomographic image 30 nearest to the view point e.

Step 4—The intersection p(z, x) of the tomographic image 30 and a line passing through the coordinates (X, Y) and the view point e is calculated, so that the distance K from the view point e to the intersection p is calculated.

Step 5—A judgment is made as to whether the intersection p is on the side surface of the cylinder (region 21) or on the forward end face of the cylinder. When the intersection p is on the side surface, the situation of the routine goes to step 7. When the intersection p is on the forward end face, the situation of the routine goes to step 6.

Step 7—When the intersection p is on the side surface of the cylinder (region 21), a judgment is made as to whether the condition K>r/sin A is satisfied or not. When this condition is satisfied, the situation of the routine goes to step 9. When this condition is not satisfied, the situation of the routine goes to step 10.

Steps 8 and 9—The aforementioned coordinate transformation and shading are carried out.

Step 10—The ordinate y is updated for processing the next tomographic image 30.

Step 11—A judgment is made as to whether the aforementioned processing for all the tomographic images 30 is completed or not. When the processing is not completed, the situation of the routine goes back to the step 4.

Step 12—The X position of the projection point is shifted by one pixel.

Step 13—A judgment is made as to whether X takes its maximum value (+256) or not. When X does not take its maximum value, the situation of the routine goes back to the step 3. The processing is repeated unless X takes its maximum value.

Step 14—The projection point is moved to the next line (Y is added by "1") and X is made X=−256.

Step 15—A judgment is made as to whether Y takes its maximum value (+256) or not. When Y does not take its maximum value, the situation of the routine goes back to the step 2. This processing is repeated unless Y takes its maximum value. When Y takes its maximum value, this processing is terminated.

Thus, a three-dimensional image is constructed as if the inside (having an area) of the subject was peeped into through a small hole.

If in the step 1, the coordinates of the view point e are made variable and r and d in FIG. 5 are made constant, the coordinates of the view point e and the coordinates of the forward end of the region 21 can be moved in parallel with each other (moved in the same direction while a predetermined distance is kept therebetween). When this parallel movement is made in the direction of the forward end of the region 21, a three-dimensional image is obtained as if the inside of the subject was observed through a peritoneoscope while the peritoneoscope was inserted into the subject.

Although the aforementioned embodiment has shown the case where the shape of the predetermined region 21 containing the view point e is a cylindrical shape, the cylindrical shape may be replaced by a spherical shape. In the case where the region 21 is shaped like a sphere, such division into various cases as in the steps 5, 6 and 7 of FIG. 6 is not required as long as only K and the radius of the sphere are compared.

Figure 7:
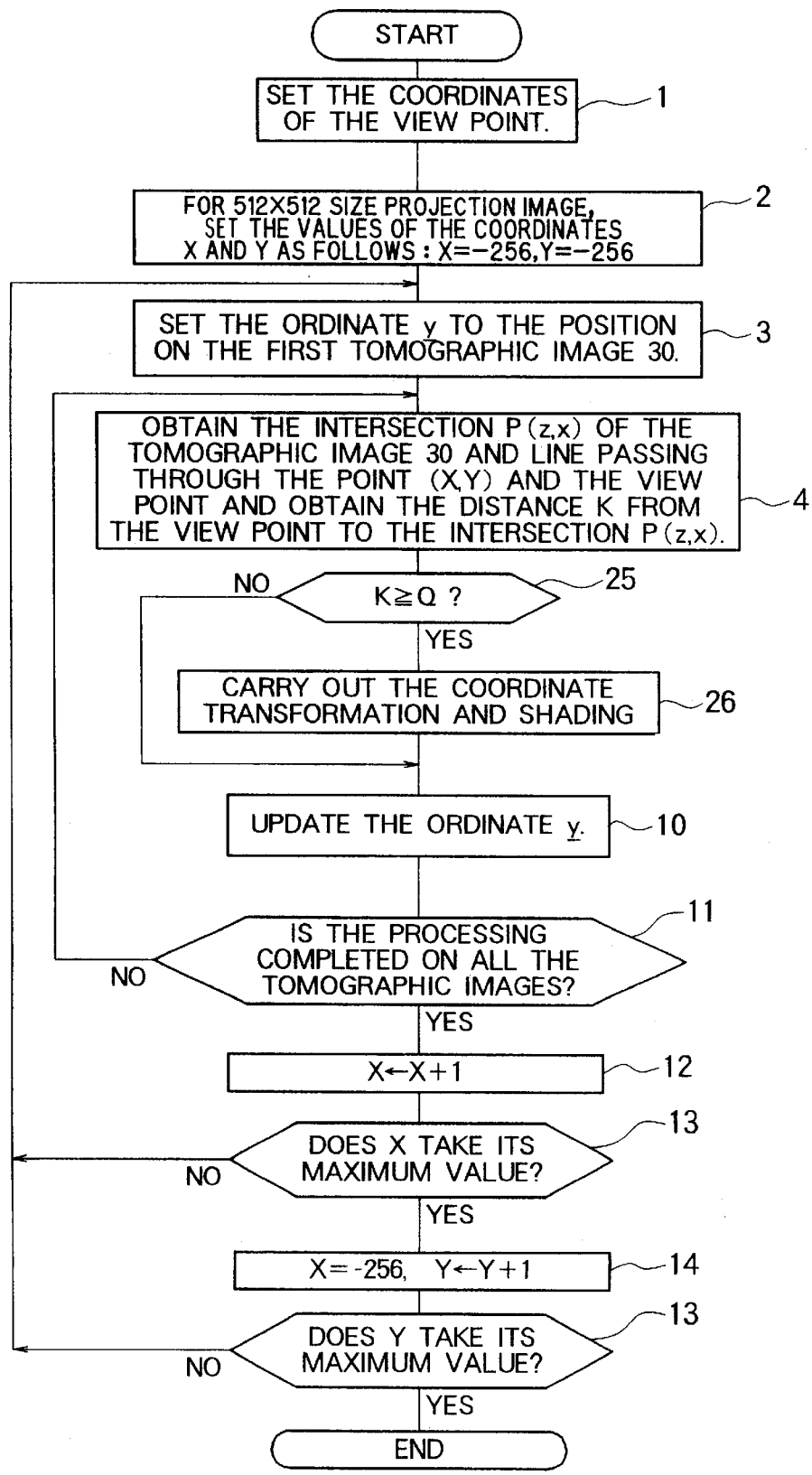
FIG. 7 is a flow chart showing another embodiment of the three-dimensional image constructing method according to the present invention.

FIG. 7 is a flow chart in the case where the region 21 is shaped like a sphere with the radius Q.

The steps 1 to 4 in FIG. 7 are equivalent to those in FIG. 6.

In step 25, the distance K from the view point to each of the tomographic images and the radius Q of the region 21 are compared.

In the case of K≧Q, coordinate transformation and shading are applied to a point (z, x) on the tomographic image (step 26).

In the case of K<Q, no processing is applied to the point (z, x) on the tomographic image and y is updated (step 10).

The steps 10 to 15 in FIG. 7 are equivalent to those in FIG. 6.

In FIG. 7, if the set values of the coordinates of the view point are updated in the step 1 whenever the processing of from the step 2 to the step 15 is carried out, a three-dimensional image is obtained as if the inside of the subject was observed through a peritoneoscope while the depth of insertion of the peritoneoscope into the subject is changed.

Figure 8:
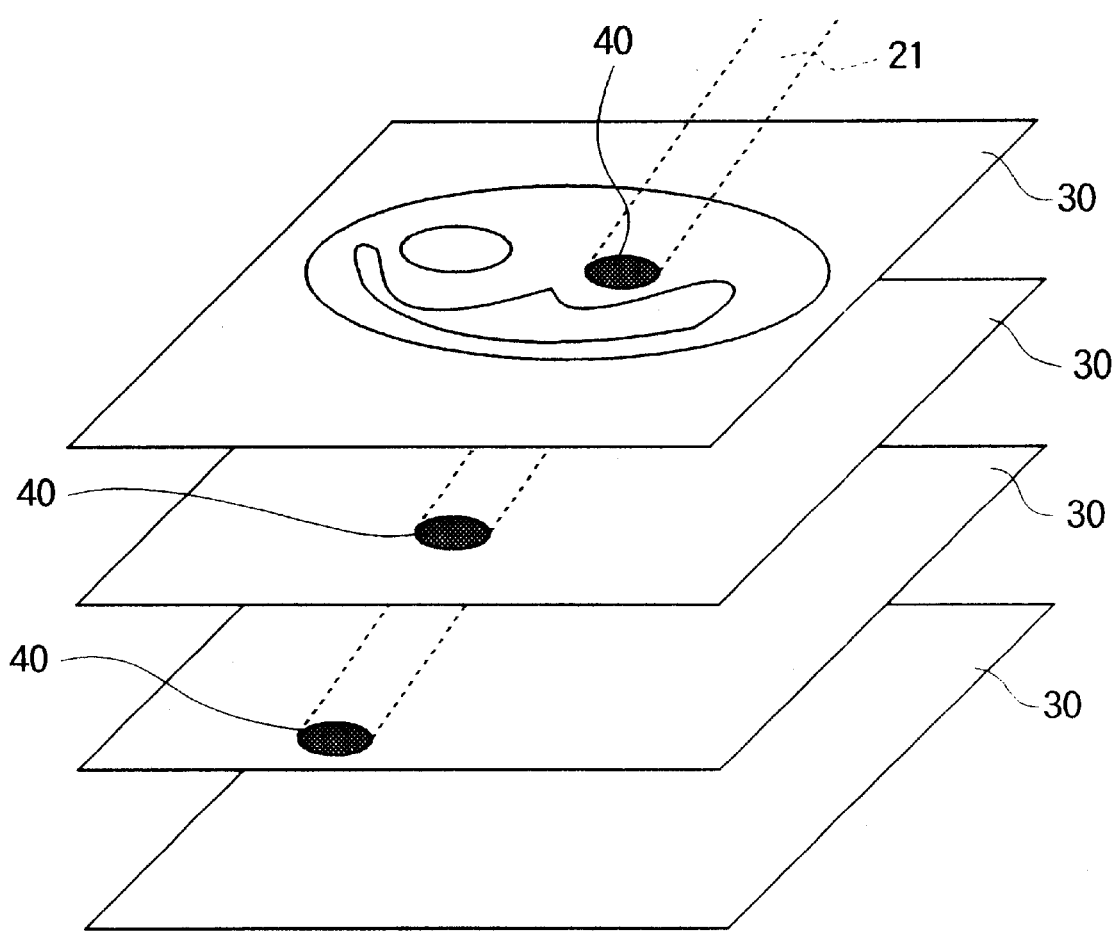
FIG. 8 is a flow chart showing a further embodiment of the three-dimensional image constructing method according to the present invention.

Further, as shown in FIG. 8, values of pixels in portions 40 contained in the region 21 among the plurality of tomographic images 30 may be changed to predetermined values so that shading is not applied. For example, the pixel values are changed to extremely large values out of the range of the threshold value for shading so that shading is not applied.

As a result, data are regarded to be absent in the region 21, so that the same effect as a hole is punctured in the subject is obtained.

Figure 9:
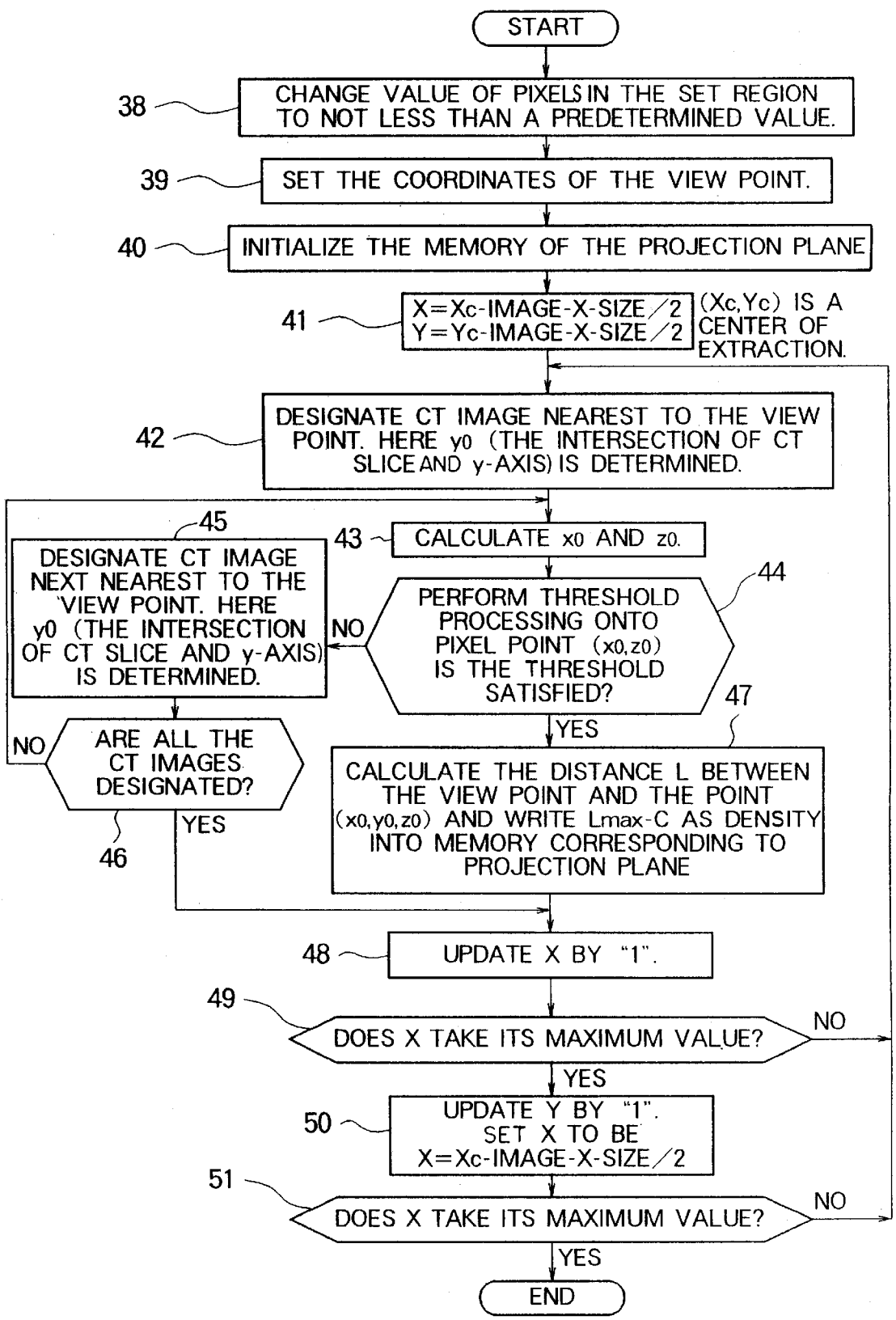
FIG. 9 is a flow chart in the case of the embodiment of FIG. 8.

By moving the view point within the region 21 in this state, a three-dimensional image is obtained as if the inside of the subject was observed through a peritoneoscope. FIG. 9 is a flow chart showing an embodiment of the present invention in the case where pixel values in the region 21 are changed to large values to obtain a three-dimensional image. The relations between the view point, the tomographic images (CT images) and the projection plane are equal to those shown in FIG. 1.

Step 38—Pixel values in the set region 21 are changed to a value out of the range of the threshold for shading.

Step 39—The coordinates of the view point are set in the region 21.

Step 40—The values of all the pixels in the memory for the projection plane are cleared (initialized).

Step 41—The display screen is extracted from the projection plane. If the size of the projection plane is equal to the size of the display screen, the projection plane coincides with the display screen. In most cases, the size of the projection plane is however set to larger than the size of the display screen. In such cases, it is necessary to extract a part corresponding to the display screen from the projection plane. Even in the case where the two sizes are equal to each other, there is some case where only a part region of the projection plane is intended to be displayed on the display screen. Also in this case, it is necessary to extract a part from the projection plane. Therefore, in this step 41, an extraction center position $(X_c, Y_c)$ is given so that a part corresponding to the extraction size of the display screen (for example, the screen size if a part corresponding to the size of the display screen is to be extracted) is extracted from the center. If the extraction center position coincides with the intersection $C_1'$, the intersection $C_1'$ preferably becomes the center of the display screen. By providing this step 41, the address (X, Y) in the display memory can be designated. The address (X, Y) designated first is the left upper of the projection plane region corresponding to the extraction size. The address is updated in accordance with raster scanning from left to right and from upper to lower (steps 48 and 50).

Step 42—This is a step of starting scanning for projecting the unit three-dimensional image. The unit three-dimensional image is defined as a part of the three-dimensional image obtained by stacking CT images. That is, the unit three-dimensional image is defined as an image obtained by stacking a plurality of CT images. First, a CT image 30 nearest to the view point is selected from the plurality of CT images. In this case, the CT images are stacked in parallel with the y axis in the absolute coordinate system x, y and z. Because the CT image number of the CT image nearest to the view point is found, the y component of the nearest CT image is found automatically on the basis of the CT image number. This y component is made $y_0$.

Figure 1:
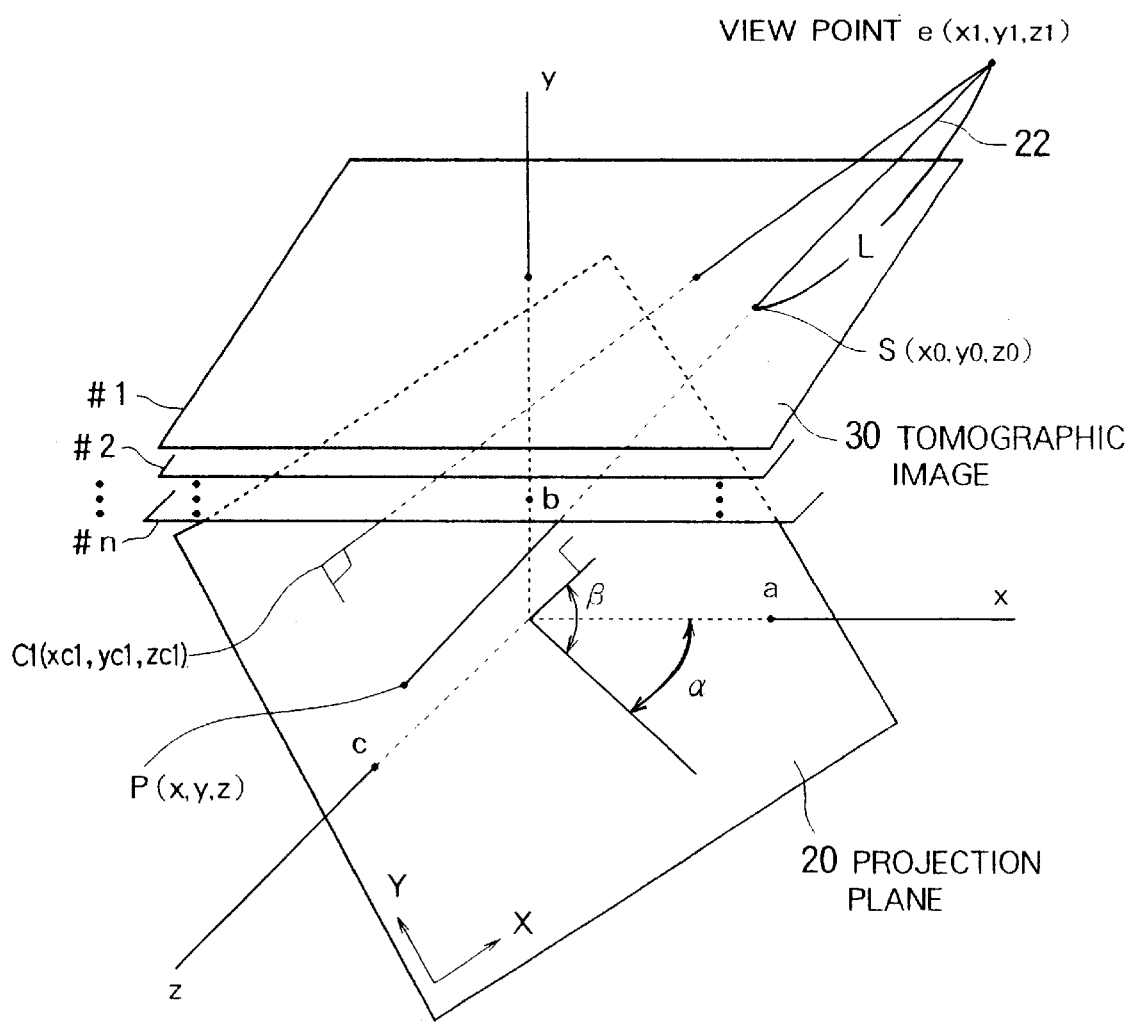
FIG. 1 is a view for explaining coordinate transformation based on a central projection method.
Figure 2:
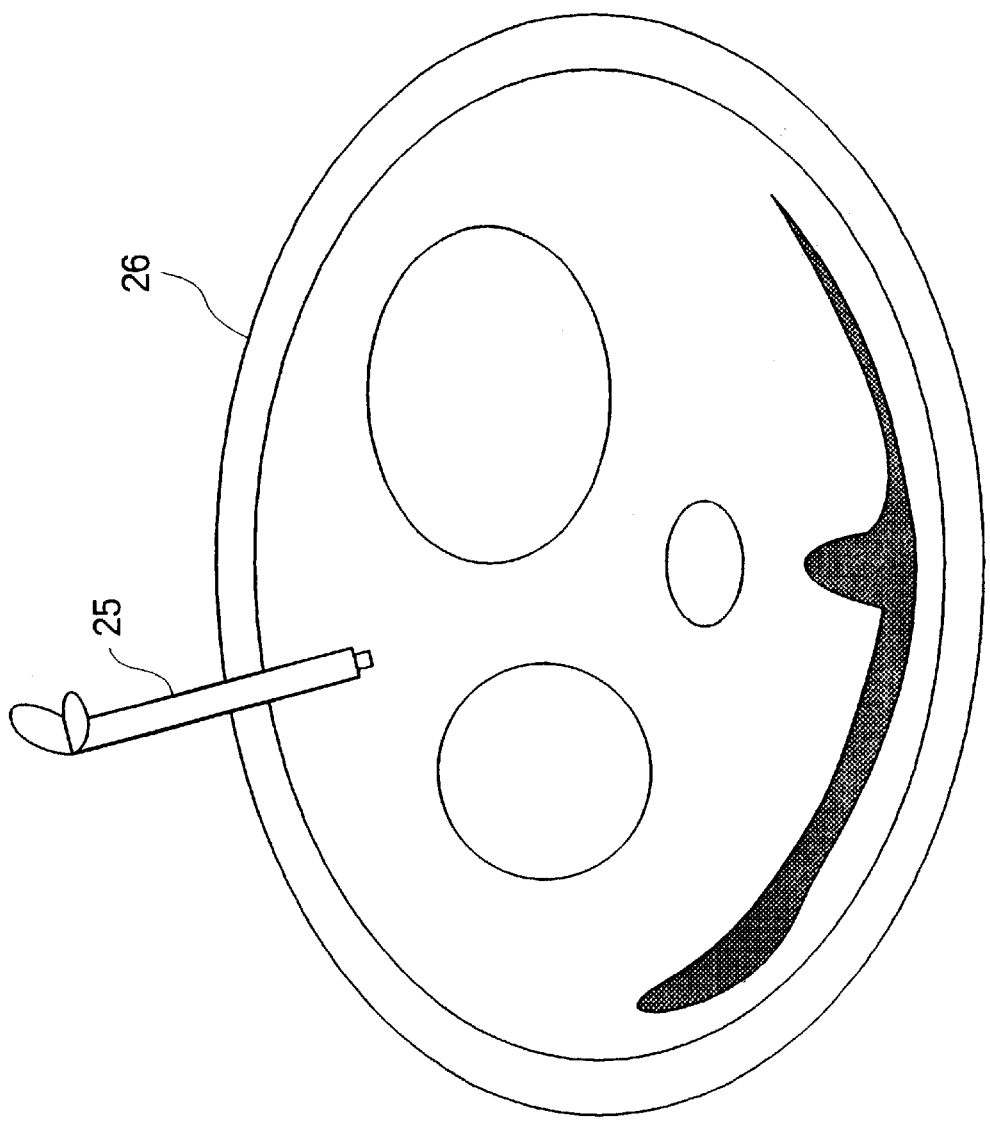
FIG. 2 is a view showing an example of use of a peritoneoscope.

Step 43—Among pixels of the CT image nearest to the view point, the coordinates $S(x_0, y_0, z_0)$ of the position S of a corresponding pixel of the tomographic image to be projected onto the address (X, Y) of the display memory are calculated. Incidentally, $y_0$ is known in advance because sliced images are stacked on the y axis (a relative value is known as "slice interval" at the time of measurement). Accordingly, in practice, $x_0$ and $z_0$ are calculated. This calculation is performed by the central projection transformation equations (3), (4) and (5). The coordinates $S(x_0, y_0, z_0)$ of the positions S of pixels corresponding to all addresses (X, Y) of the display memory are calculated. In FIG. 1, the point p on the projection plane 20 corresponds to the address (X, Y) of the display memory and the point S on the tomographic image 30 corresponds to the position of a corresponding pixel of the tomographic image. Incidentally, in FIG. 1, the arbitrary point P on the projection plane is expressed as the coordinates (x, y, z) in the absolute coordinate system x, y and z. Further, the point $C_1(x_{c1}, y_{c1}, z_{c1})$ is the intersection of a perpendicular drawn from the view point e to the projection plane 20.

The central projection transformation equations are roughly classified into two. The first is equations for transforming the XY coordinate system to the xyz coordinate system. The second is equations for determining the coordinates of the point S. The equations (3), (4) and (5) are equations for transforming the XY coordinate system to the xyz coordinate system.

In the manual mode, the coordinates $(x_1, y_1, z_1)$ of the view point e are given freely by key inputting or the like, so that the coordinates $x_0$ and $z_0$ of the pixel point S on the tomographic image $y_0=d_0$ are determined in accordance with the equations (9) and (10).

Although the above description has been made upon the case where one tomographic image #1 is used, a plurality of tomographic images (#1, #2, . . . ) are used in practice and $d_0$ takes a plurality of values. Accordingly, a plurality of points $(x_0, z_0)$ to be projected are determined correspondingly to one combination of X and Y. A point $(x_0, z_0)$ on a tomographic image to be projected is selected from the plurality of points. The Z buffer method (using the distance R instead of the Z component) may be used for the selection but, in this embodiment, another method is used. Therefore, steps 44, 45 and 46 are provided.

Steps 44, 45 and 46—In the step 44, threshold processing is applied to a pixel point $(x_0, z_0)$. This is for the purpose of extracting a concerned place. The threshold value is provided for the extraction. For example, the concerned place is, for example, an internal organ (such as an intestine or a bronchial tube). By providing a threshold value for extracting an internal organ, the concerned internal organ is extracted automatically. If the pixel point $(x_0, z_0)$ is out of range of the threshold value, the next CT image (that is, the second nearest CT image to the view point) #2 is designated in the step 45 and a pixel point $(x_0, z_0)$ on $y=y_0$ corresponding to the address (X, Y) designated in the step 41 is found in the step 43 ($y_0$ is calculated automatically from the set CT image) and a judgment is made again in the step 44 as to whether the pixel value satisfies the range of the threshold value or not. With the updating of the CT image, $y_0$ is updated. If the pixel value is out of the range of the threshold value, the next nearest CT image (#3) is designated again in the step 45. Thereafter, if there is no pixel value satisfying the range of the threshold value in all CT images to be projected to the address (X, Y) designated in the step 41, the situation of the routine goes to step 47 via the step 46. If the pixel value satisfying the range of the threshold value is present in the pixel point $(x_0, z_0)$ on $y=y_0$ of the CT image #i, searching of CT images #(i+1), #(i+2), . . . on the deeper side is stopped. Then, the situation of the routine goes to step 47.

Step 47—The distance L between the view point $e(x_1, y_1, z_1)$ and the pixel point $(x_0, z_0)$ on $y=y_0$ is obtained as follows.

$$L=\sqrt{(x_1-x_0)^2+(y_1-y_0)^2+(z_1-z_0)^2}$$

The density I is obtained on the basis of L thus calculated.

$$I=L\text{ max}-C\cdot L$$

Here, L max is a predetermined reference and maximum value of L, and C is a constant which is generally made 1. This density I is density obtained by the depth method and, at the same time, density after hidden-surface processing as processed by a kind of Z buffer. Thus, shading and hidden-surface processing are applied to one point (X, Y), so that the processed density of this point is stored as a pixel value of three-dimensional image in the memory address (X, Y) of a memory corresponding to the projection plane.

Step 48—The display extraction address X is updated by +1.

Step 49—A judgment is made as to whether X reaches the maximum value of the display extraction address or not. If X does not reach the maximum value, the situation of the routine goes back to the step 42. If X reaches the maximum value, the situation of the routine goes to step 50.

Step 50—When the display extraction address X reaches the maximum value, the display extraction address Y is updated by 1 to change the address by one line. The address X is returned to the initial value.

Step 51—A judgment is made as to whether the display extraction address Y reaches the maximum value or not. If Y does not reach the maximum value, the situation of the routine goes back to the step 42. If Y reaches the maximum value, the whole routine is terminated.

The embodiments described in this specification are illustrative and not restrictive. The scope of the present invention is defined in the appended claims, and all changes that fall within meets and bounds of the claims are therefore intended to embraced by the present invention.

What is claimed is:

1. A method of constructing a three-dimensional image by using a central projection method, comprising the steps of:

(a) setting coordinates of a point of view on a memory space so that a projection subject image is located between the view point and a projection plane;

(b) setting a predetermined region such that the predetermined region extends into the projection subject image and contains the view point;

(c) judging whether coordinates of a pixel of the projection subject image are in the predetermined region or not; and (d) applying coordinate transformation according to the central projection method and shading to the coordinates of the pixel only when the coordinates of the pixel are outside the predetermined region, while the coordinate transformation according to the central projection method and the shading are not applied to the coordinates of the pixel when the coordinates of the pixel are inside the predetermined region.

2. A method of constructing a three-dimensional image according to claim 1, wherein the step (b) includes the step of setting the predetermined region to have a cylindrical shape.

3. A method of constructing a three-dimensional image according to claim 1, wherein the step (b) includes the step of setting the predetermined region to have a spherical shape.

4. A method of constructing a three-dimensional image according to claim 1, wherein the step (b) includes the step of setting pixel values of pixels of the projection subject image inside the predetermined region to values to which shading is not applied.

5. A method of constructing a three-dimensional image according to claim 1, further comprising the steps of:

moving the coordinates of the view point by a first distance in a first direction inside the predetermined region;

moving a forward end, in the direction of movement of the view point, of the predetermined region by the first distance in the first direction; and executing the steps (c) and (d).

6. A method of constructing a three-dimensional image according to claim 1, wherein the step (b) includes the step of setting the predetermined region such that the view point contained in the predetermined region is inside the projection subject image.

7. A method of constructing a three-dimensional image, comprising the steps of:

arranging an object to be projected between a view point and a projection plane;

designating a region such that the designated region extends into the object and contains the view point; and displaying, on a screen, a region of the object other than a region of the object inside the designated region.

8. A method of constructing a three-dimensional image according to claim 7, wherein the designated region includes at least a first region within the object;

wherein the region displayed in the displaying step is a second region within the object excluding the first region; and wherein the displaying step includes the step of displaying the second region on the screen as a projection image obtained by projecting the second region on the projection plane from the view point in the designated region.

9. A method of constructing a three-dimensional image according to claim 7, wherein the designating step includes the step of designating the region such that the view point contained in the designated region is inside the object.

10. A method of constructing a three-dimensional image comprising the steps of:

arranging an object to be projected between a view point and a projection plane;

designating a region such that the designated region extends into the object and contains the view point; and displaying, on a screen, a region of the object other than a region of the object inside the designated region while moving the designated region toward the projection plane.

11. A method of constructing a three-dimensional image according to claim 10, wherein the designated region includes at least a first region within the object;

wherein the region displayed in the displaying step is a second region within the object excluding the first region, the second region changing in accordance with the movement of the designated region toward the projection plane in the displaying step; and wherein the displaying step includes the step of displaying the second region on the screen as a projection image obtained by projecting the second region on the projection plane from the view point in the designated region, the projection image changing in accordance with the movement of the designated region toward the projection plane.

12. A method of constructing a three-dimensional image according to claim 10, wherein the designating step includes the step of designating the region such that the view point contained in the designated region is inside the object.

13. A method of constructing a three-dimensional image comprising the steps of:

arranging an object to be projected between a view point and a projection plane;

designating a region such that the designated region extends into the object and contains the view point; and displaying, on a screen, a region of the object other than a region of the object inside the designated region while extending the designated region toward the projection plane.

14. A method of constructing a three-dimensional image according to claim 13, wherein the designated region includes at least a first region within the object;

wherein the region displayed in the displaying step is a second region within the object excluding the first region, the second region changing in accordance with the extension of the designated region toward the projection plane in the displaying step; and wherein the displaying step includes the step of displaying the second region on the screen as a projection image obtained by projecting the second region on the projection plane from the view point in the designated region, the projection image changing in accordance with the extension of the designated region toward the projection plane.

15. A method of constructing a three-dimensional image according to claim 13, wherein the designating step includes the step of designating the region such that the view point contained in the designated region is inside the object.

* * * * *